(12) United States Patent
Ikeji

(10) Patent No.: US 8,913,346 B2
(45) Date of Patent: Dec. 16, 2014

(54) SUSPENSION FOR A DISK DRIVE INCLUDING A LOAD BEAM HAVING A RECESS CONTAINING A DAMPER, AND METHOD FOR MANUFACTURING SUSPENSION

(75) Inventor: Yoichi Ikeji, Yokohama (JP)

(73) Assignee: NHK Spring Co., Ltd., Kanagawa (JP)

( * ) Notice: Subject to any disclaimer, the term of this patent is extended or adjusted under 35 U.S.C. 154(b) by 284 days.

(21) Appl. No.: 13/423,864

(22) Filed: Mar. 19, 2012

(65) Prior Publication Data

US 2012/0176704 A1 Jul. 12, 2012

Related U.S. Application Data

(62) Division of application No. 12/704,712, filed on Feb. 12, 2010, now Pat. No. 8,161,626.

(30) Foreign Application Priority Data

Feb. 17, 2009 (CN) .......................... 2009 1 0006550

(51) Int. Cl.
*G11B 5/55* (2006.01)
*G11B 5/48* (2006.01)

(52) U.S. Cl.
CPC ................................. *G11B 5/4833* (2013.01)
USPC .................................... 360/244.8; 380/244.3

(58) Field of Classification Search
USPC ................................ 360/244.2, 244.3, 244.8
See application file for complete search history.

(56) References Cited

U.S. PATENT DOCUMENTS

| | | | |
|---|---|---|---|
| 5,187,625 A | 2/1993 | Blaeser et al. | |
| 5,461,525 A * | 10/1995 | Christianson et al. | 360/244.8 |
| 5,825,590 A * | 10/1998 | Ohwe | 360/244.8 |
| 5,936,808 A * | 8/1999 | Huang et al. | 360/265.9 |
| 5,949,617 A * | 9/1999 | Zhu | 360/244.8 |
| 5,963,397 A | 10/1999 | Grill et al. | |
| 6,212,043 B1 * | 4/2001 | Nakamura et al. | 360/244.3 |
| 6,271,996 B1 * | 8/2001 | Houk et al. | 360/244.9 |
| 6,297,933 B1 | 10/2001 | Khan et al. | |
| 6,731,465 B2 * | 5/2004 | Crane et al. | 360/244.3 |
| 6,731,466 B2 * | 5/2004 | Arya | 360/244.3 |
| 6,735,050 B2 | 5/2004 | Takagi et al. | |
| 6,823,581 B2 | 11/2004 | Kidachi et al. | |
| 7,064,931 B2 * | 6/2006 | Hutchinson | 360/244.8 |

(Continued)

FOREIGN PATENT DOCUMENTS

| | | |
|---|---|---|
| EP | 0 847 043 A1 | 6/1998 |
| JP | 3-134875 A | 6/1991 |

(Continued)

OTHER PUBLICATIONS

Japanese Office Action dated Oct. 22, 2013 (and English translation thereof) in counterpart Japanese Application No. 2010-025668.

(Continued)

*Primary Examiner* — Brian Miller
(74) *Attorney, Agent, or Firm* — Holtz, Holtz, Goodman & Chick PC

(57) ABSTRACT

A suspension for supporting a magnetic head is provided with a load beam formed of a thin-plate spring. A recess for accommodating a damper is formed in the load beam. The damper is affixed to a bottom surface of the recess.

6 Claims, 8 Drawing Sheets

(56) References Cited

U.S. PATENT DOCUMENTS

| | | |
|---|---|---|
| 7,161,766 B2 | 1/2007 | Kidachi et al. |
| 7,203,033 B2 | 4/2007 | Boutaghou |
| 7,210,221 B2 | 5/2007 | Kidachi et al. |
| 7,380,329 B2 | 6/2008 | Kidachi et al. |
| 7,420,778 B2* | 9/2008 | Sassine et al. ............ 360/244.9 |
| 7,929,245 B2* | 4/2011 | Hanrahan ................. 360/97.19 |
| 7,929,254 B2* | 4/2011 | Soga et al. .................... 360/266 |
| 8,142,671 B1* | 3/2012 | Pan ................................. 216/22 |
| 8,161,626 B2* | 4/2012 | Ikeji ........................... 29/603.06 |
| 8,213,122 B1* | 7/2012 | Lowry ....................... 360/244.8 |
| 8,369,046 B2* | 2/2013 | Nojima ...................... 360/244.2 |
| 2005/0157427 A1 | 7/2005 | Renken et al. |

FOREIGN PATENT DOCUMENTS

| | | |
|---|---|---|
| JP | 6-504646 A | 5/1994 |
| JP | 9-91909 A | 4/1997 |
| JP | 10-162532 A | 6/1998 |
| JP | 2002-133806 A | 5/2002 |
| JP | 2002-170351 A | 6/2002 |
| JP | 2004-127487 A | 4/2004 |
| JP | 2005-116024 A | 4/2005 |

OTHER PUBLICATIONS

Chinese Office Action dated Dec. 19, 2011 issued in counterpart Chinese Application No. 200910006550.3.

Japanese Office Action dated Jan. 28, 2014 (and English translation thereof) in counterpart Japanese Application No. 2010-025668.

\* cited by examiner

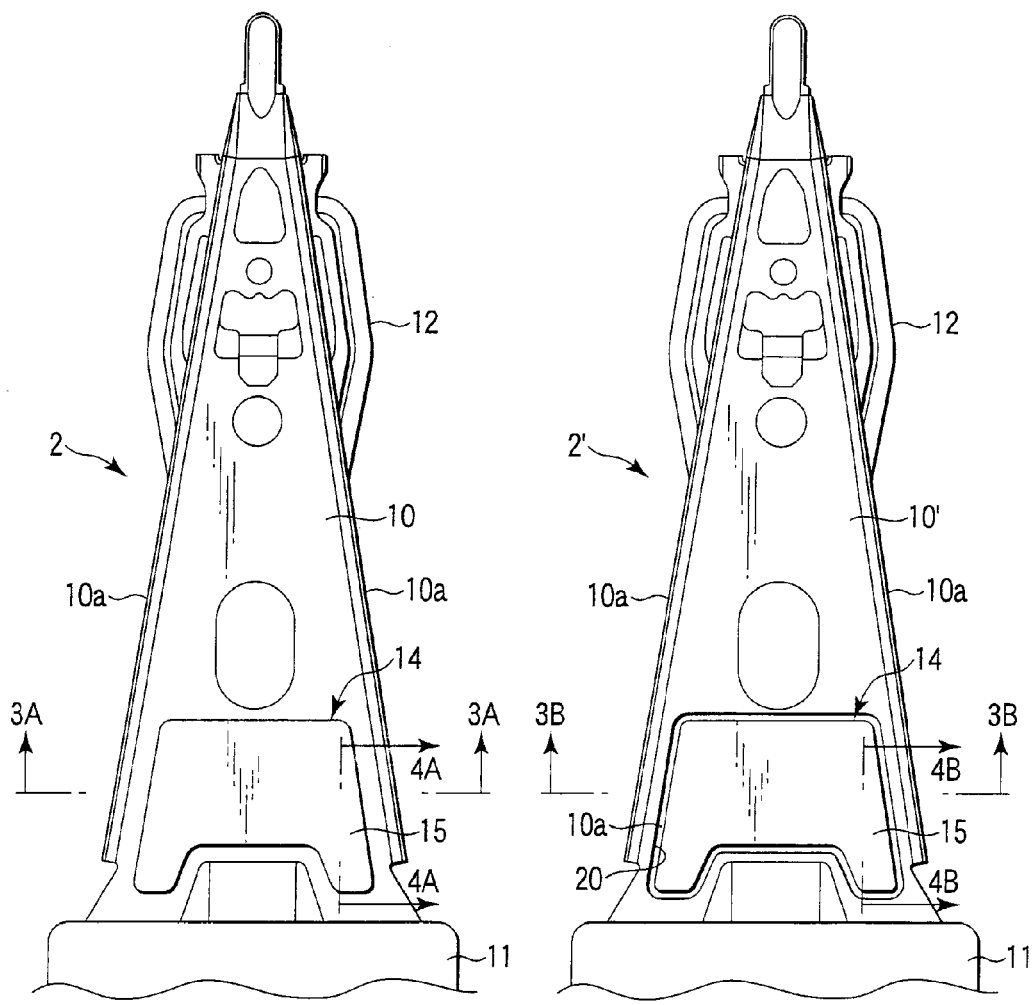
FIG. 1A
PRIOR ART
FIG. 1B
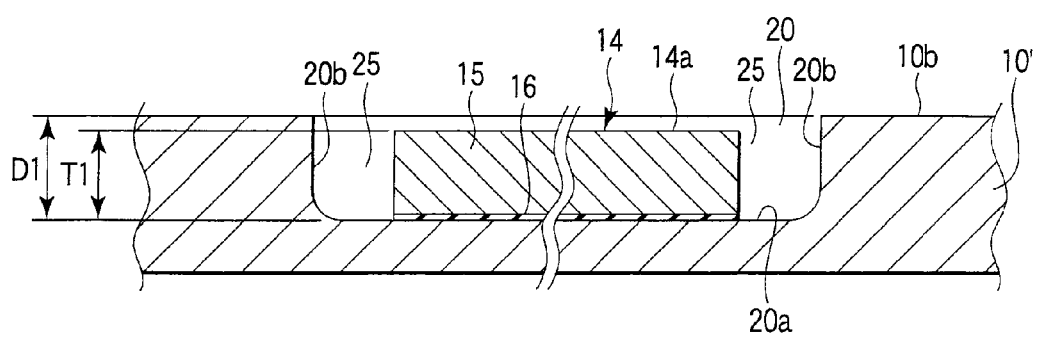
FIG. 2

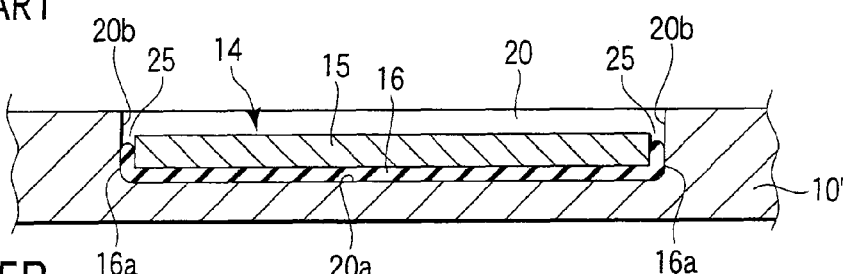
F I G. 5B
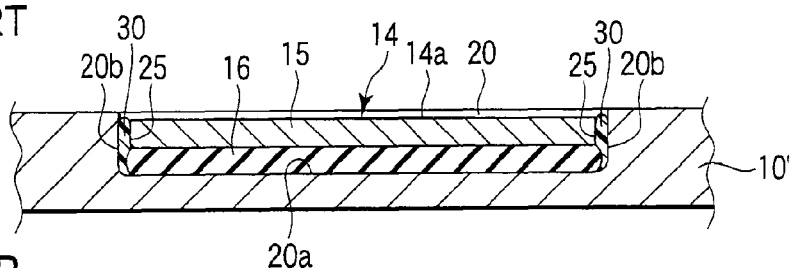
F I G. 6B
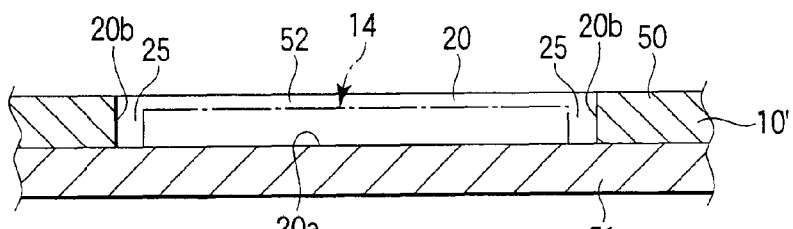
F I G. 6C

SUSPENSION FOR A DISK DRIVE INCLUDING A LOAD BEAM HAVING A RECESS CONTAINING A DAMPER, AND METHOD FOR MANUFACTURING SUSPENSION

CROSS-REFERENCE TO RELATED APPLICATIONS

This is a Divisional of U.S. application Ser. No. 12/704,712, filed Feb. 12, 2010 (now U.S. Pat. No. 8,161,626), which application is based upon and claims the benefit of priority from prior Chinese Patent Application No. 200910006550.3, filed Feb. 17, 2009, the entire contents of both of which are incorporated herein by reference.

BACKGROUND OF THE INVENTION

1. Field of the Invention

The present invention relates to a load beam constituting a part of a suspension of a disk drive, suspension with the load beam, and a manufacturing method for the suspension.

2. Description of the Related Art

Conventionally, a magnetic disk device, such as a hard disk drive (HDD) or magneto-optical drive, comprises a magnetic head. The head flies above a magnetic disk rotating at high speed with a fine space therebetween. Data on the disk is read or written by the head.

An example of a suspension is disclosed in, for example, Jpn. Pat. Appln. KOKAI Publication No. 10-162532 or 9-91909.

In recent years, the head size and flying height (above the disk surface) have been reduced with the development of disk devices with higher recording densities. In order to accurately read and write magnetic disk data, it is important to suppress vibration of a head portion, thereby precisely positioning the head.

As shown in FIG. 10, a disk drive with a suspension generally comprises a magnetic head 1, a suspension 2 supporting the head 1, a block 3 to which the suspension 2 is fixed, etc. The suspension 2 generally comprises a load beam 10 formed of a precise thin-plate spring, a baseplate 11, a flexure 12 formed of a plate spring thinner than the load beam 10, etc. The magnetic head 1 is located on a gimbal portion formed at the distal end of the flexure 12.

A head portion comprising the magnetic head 1 receives vibration from a device for driving the head portion, a motor (not shown) for rotating a disk 13, etc. Thus, the suspension 2 formed of a plate spring, may be deformed so that the magnetic head 1 is dislocated. This results in a read or write error. Thereupon, the damper 14, such as the one shown in FIG. 11, may be used to reduce or remove vibration of the suspension 2. The damper 14 is also referred to as a vibration damping member. The damper 14 comprises a metallic restrainer 15 and viscoelastic member 16 of a viscoelastic material, which are laminated thickness-wise. The damper 14 is affixed to the load beam 10 of the suspension 2.

According to the suspension 2 with the damper 14, the viscoelastic member 16 sandwiched between the vibrating suspension 2 and restrainer 15 is deformed as the suspension 2 vibrates. Molecular friction of the viscoelastic member 16 produces internal resistance, thereby converting vibrational energy into thermal energy. Thus, the vibrational energy directly received by the suspension 2 is greatly reduced, so that a vibration dumping effect can be obtained. FIG. 12A shows vibration characteristics observed before the damper 14 is affixed to the load beam 10. FIG. 12B shows vibration characteristics observed after the damper 14 is affixed to the load beam 10. As shown in FIG. 12B, a damping effect obtained from the damper 14 affixed to the load beam 10 lowers the peak value of a gain in each vibration mode and provides the vibration damping effect.

As shown in FIGS. 3A and 4A, transversely opposite side edge portions 10a of the load beam 10 are bent in order to enhance the rigidity of the load beam 10. In this specification, the bending of the bent side edge portions 10a is referred to as "rib bending". In order to maintain an appropriate flying height of the magnetic head 1 above the surface of the disk, moreover, a proximal portion 10b of the load beam 10 is slightly bent, as viewed laterally relative to the load beam 10, as shown in FIG. 4A. The proximal portion 10b is located near the block 3 and also functions as a hinge portion for warping the load beam 10 thickness-wise. In this specification, the bending of the proximal portion 10b is referred to as "load bending". If the damper 14 is affixed to the load beam 10 before this load bending, it may undesirably interfere with a bending tool during the rib or load bending. In actual manufacturing processes, therefore, the damper 14 is affixed to the load beam 10 after the load beam 10 is bent, as shown in FIGS. 9A to 9D.

In order to cause the viscoelastic member 16 to adhere closely to the load beam 10 in affixing the damper 14 to the load beam 10, however, the damper needs to be pressed against the load beam 10 with a predetermined load. In some cases, the load beam 10 may be deformed by a pressing force on the damper 14 that is affixed to the bent load beam. If the load beam 10 is deformed, static properties, such as spring load, and dynamic properties, such as resonance, may vary. Variations of these properties impair the commodity value and working properties of the suspension.

If the damper is dislocated with respect to the load beam when it is affixed to the load beam, moreover, it may adversely affect the properties of the suspension. Conventionally, it is difficult to accurately position the damper, since the damper is affixed to the load beam formed of a flat thin-plate spring that carries no indication of a damper mounting position.

According to the conventional manufacturing processes in which the damper is affixed to the bent load beam, the opposite side edge portions 10a that are bent like ribs hinder the operation for affixing the damper 14. Since one damper 14 is affixed to each load beam 10, furthermore, the affixing operation is time-consuming, that is, work performance is poor.

Conventionally, the viscoelastic member is sometimes caused to project much from the periphery of the damper by the pressing force on the damper that is affixed to the load beam. In such a case, it is troublesome and difficult to thoroughly remove a projecting part of the viscoelastic member. In some cases, the periphery of the viscoelastic member is covered by a resin coating material after the damper is affixed to the load beam. In these cases, the usage of the coating material is too much to reduce the weight of the load beam.

BRIEF SUMMARY OF THE INVENTION

Accordingly, the object of the present invention is to provide a load beam having stable properties such that it is less deformed by a damper affixed thereto, a suspension, and a manufacturing method for the suspension.

A load beam of the invention is formed of a thin-plate spring and constitutes a part of a suspension which supports a magnetic head, and a recess is formed in a part of the load beam so as to accommodate the damper. The recess may be formed by either partial etching or pressing. Alternatively, the recess may be formed by boring a through-hole greater than the damper in one of two plates which are superposed to each other to form the load beam. The depth of the recess should preferably be greater than the thickness of the damper.

A suspension according to the invention is the one which supports the magnetic head and comprises the above-described load beam, the damper being affixed to a bottom surface of the recess of the load beam.

In a method for manufacturing the suspension, the load beam is bent after the damper is affixed to the bottom surface of the recess of the load beam.

Further, the suspension manufacturing method described above may comprise fabricating a continuous load beam blank comprising a plurality of the load beams from a thin-plate spring material, forming the recess for accommodating the damper in each of the load beams of the load beam blank, affixing the damper to the bottom surface of the recess of each of the load beams, and bending each of the load beams after the damper is affixed thereto and separating the load beam from a scrap portion of the load beam blank.

According to the present invention, as described above, the recess greater than the damper is formed in the load beam, corresponding to a position where the damper is affixed. The damper is contained in the recess. Thus, the damper can be prevented from interfering with a bending tool even if the load beam is bent with the damper affixed thereto. Therefore, the damper can be affixed to the unbent flat load beam. Accordingly, the load beam cannot be easily deformed, so that the static and dynamic properties of the suspension can be prevented from varying. The recess should only be sufficiently large to accommodate the damper. In consideration of the work performance for the affixture of the damper to the load beam and the projection of the viscoelastic member, the recess should preferably be slightly larger than the damper.

The recess is formed by, for example, partial etching. Since the recess formed by partial etching can be used as a guide for the affixture of the damper, the damper can be easily positioned with respect to the load beam.

Since the damper can be affixed to the unbent flat load beam, moreover, the operation for affixing the damper can be easily automated. Since the damper can be affixed to each load beam of the continuous load beam blank that comprises a plurality of unbent load beams, in particular, the damper affixing operation can be automated with higher speed and accuracy and less deformation. In this case, the efficiency of the damper affixing operation can be further improved.

As the damper is pressed against and affixed to the load beam, a part of its viscoelastic member may sometimes be caused to project from the periphery of the restrainer. According to the present invention, however, the damper is contained in the recess, so that the projecting part of the viscoelastic member can be confined within a groove defined between the inner side surface of the recess and the side surface of the damper. Thus, the viscoelastic member can be prevented from projecting outside the load beam. Since the groove exists inside the recess, moreover, a coating material (e.g., resin) can be easily filled around the damper, and the usage of the coating material can be reduced.

Thus, according to the present invention, the damper is contained in the recess formed in the load beam. The weight of the load beam itself can be reduced by a margin corresponding to the recess. Consequently, an increase in weight attributable to the presence of the damper can be compensated with a reduction of the weight of the load beam, so that the suspension can be made lighter in weight.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 1A is a plan view of a conventional suspension;

FIG. 1B is a plan view of a suspension according to one embodiment of the invention;

FIG. 2 is a partial sectional view typically showing a load beam and damper of the suspension shown in FIG. 1B;

FIG. 5B is a sectional view showing how a viscoelastic member of a damper of the suspension according to the invention projects from the periphery of a restrainer;

FIG. 6B is a sectional view showing how the periphery of the damper of the suspension of the invention is covered by a coating material;

FIG. 6C is a sectional view showing another example of the load beam of the suspension of the invention;

DETAILED DESCRIPTION OF THE INVENTION

One embodiment of the present invention will now be described with reference to the accompanying drawings.

Figure 3A:
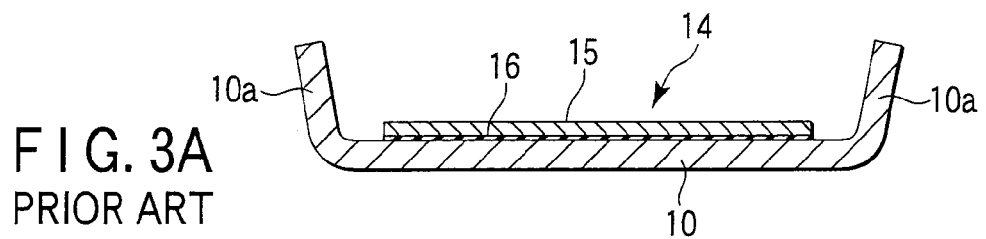
FIG. 3A is a sectional view of the suspension taken along line 3A-3A of FIG. 1A.
Figure 3B:
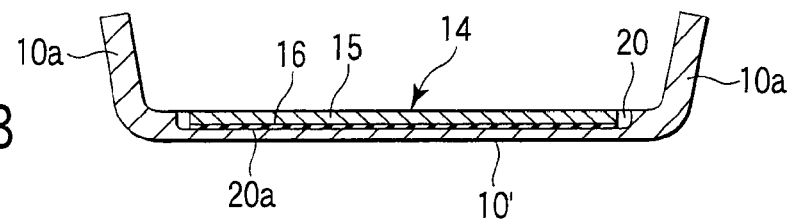
FIG. 3B is a sectional view of the suspension taken along line 3B-3B of FIG. 1B.
Figure 4A:
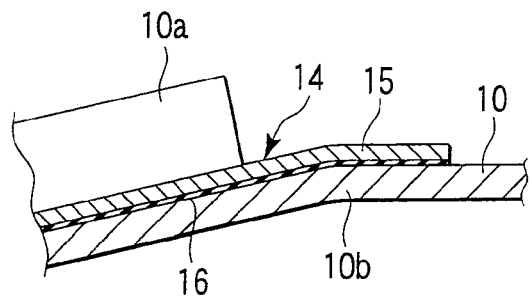
FIG. 4A is a sectional view of the suspension taken along line 4A-4A of FIG. 1A.
Figure 4B:
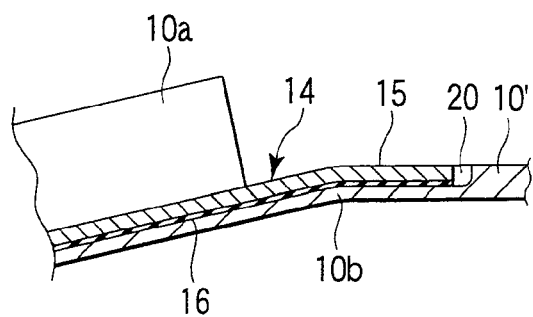
FIG. 4B is a sectional view of the suspension taken along line 4B-4B of FIG. 1B.

FIG. 1A is a plan view of the suspension 2 comprising the conventional load beam 10. FIG. 1B is a plan view of a suspension 2' comprising a load beam 10' according to the invention. FIG. 2 is a sectional view typically showing the load beam 10' and a damper 14 according to the invention. A recess 20 is formed in a part of the load beam 10'. FIG. 3A is an enlarged sectional view taken along line 3A-3A of FIG. 1A. FIG. 3B is an enlarged sectional view taken along line 3B-3B of FIG. 1B. FIG. 4A is an enlarged sectional view taken along line 4A-4A of FIG. 1A. FIG. 4B is an enlarged sectional view taken along line 4B-4B of FIG. 1B.

Figure 10:
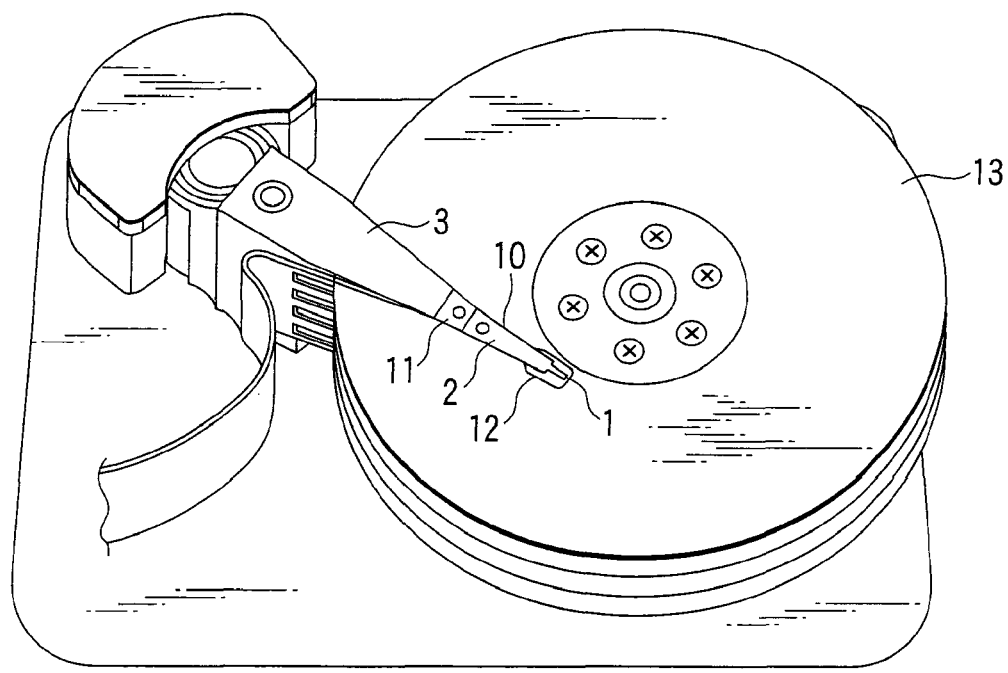
FIG. 10 is a perspective view showing a part of a disk drive.

The load beam 10 shown in FIG. 3A is bent so that its transversely opposite side edge portions 10a rise like ribs. A central part of the conventional load beam 10 has a flat surface. In the load beam 10 shown in FIG. 4A, the proximal portion 10b near the block 3 (FIG. 10) is slightly bent. In the conventional load beam 10, the damper 14 is affixed to the flat surface between the side edge portions 10a. Thus, in the conventional suspension 2, the damper 14 projects to a height equal to its thickness above the flat surface of the load beam 10.

As shown in FIG. 3B, on the other hand, the load beam 10' according to the present invention is formed with the recess 20 larger than the damper 14 in that part thereof on which the damper is located. The "recess greater than the damper" implies that the recess 20 is wider than the damper 14 when the load beam 10' is viewed vertically from above (FIG. 1B). The damper 14 is contained in the recess 20. The load beam 10' is formed of a thin-plate spring. This thin-plate spring is a springy stainless-steel plate with a thickness of, for example, 50 to 100 μm.

As shown in FIG. 4B, a proximal portion 10b of the load beam 10' is slightly bent thickness-wise, as viewed laterally relative to the load beam. The proximal portion 10b is located near the block 3 and also functions as a hinge portion for warping the load beam 10' thickness-wise. The recess 20 is formed in a region including this hinge portion (or proximal portion 10b). Thus, a part of the damper 14 is located in the hinge portion (or proximal portion 10b).

Figure 11:
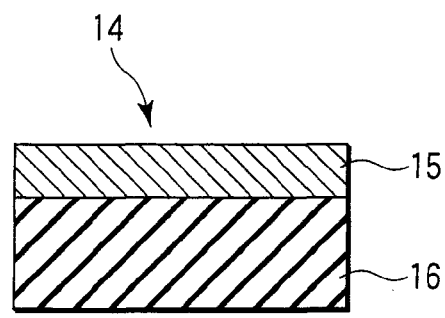
FIG. 11 is a sectional view showing a part of the damper.
Figure 12A:
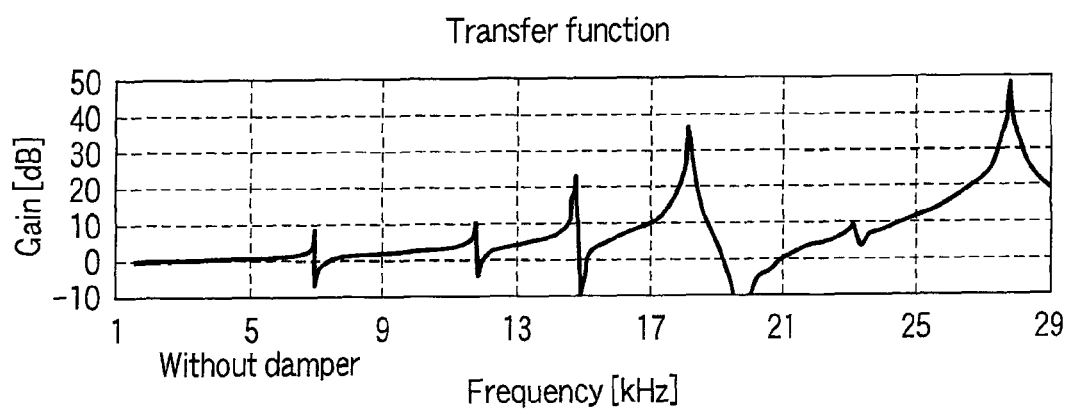
FIG. 12A is a diagram showing vibration characteristics of a suspension without a damper.
Figure 12B:
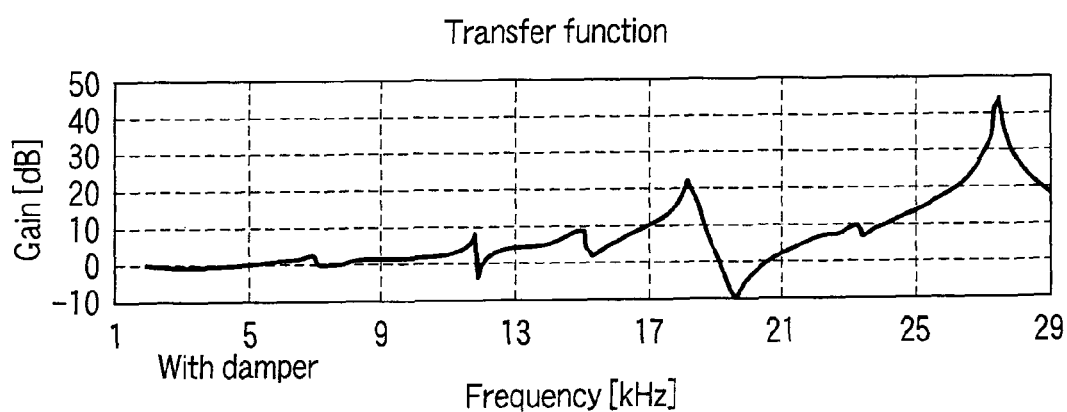
FIG. 12B is a diagram showing vibration characteristics of a suspension with a damper.

As shown in FIG. 11, the damper 14 comprises a metallic restrainer 15 and viscoelastic member 16, which are laminated thickness-wise. The restrainer 15 is affixed to a bottom surface 20a of the recess 20 with the viscoelastic member 16 between them. As shown in FIG. 2, the upper surface of the restrainer 15, that is, a surface 14a of the damper 14, is located within the recess 20. In other words, the surface 14a of the damper 14 does not project outside a surface 10d of the load beam 10'.

According to the load beam 10' of the present embodiment, therefore, interference of a bending tool with the damper 14 can be avoided while the load beam with the damper 14 thereon is being bent. Thus, the load beam 10' can be bent after the damper 14 is affixed thereto. In addition, the recess 20 can be used as a positioning guide in affixing the damper 14 to the load beam 10'. Accordingly, the damper 14 can be easily positioned with respect to the load beam 10'.

Figure 5A:
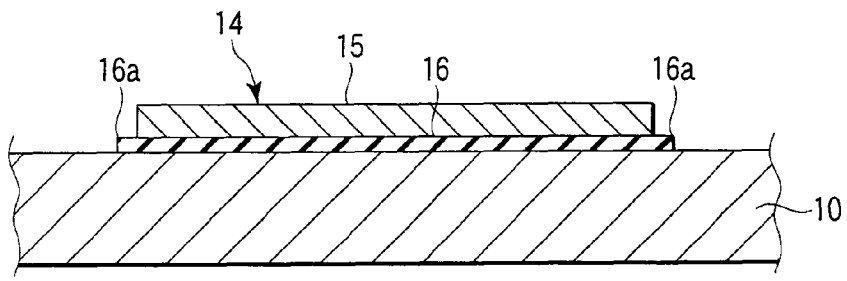
FIG. 5A is a sectional view showing how a viscoelastic member of a damper of the conventional suspension projects from the periphery of a restrainer.

In affixing the damper 14 to the bottom surface 20a of the recess 20, the damper 14 is pressed against the load beam 10'. By this pressing force, a part of the viscoelastic member 16 may sometimes be caused to project from the periphery of the restrainer 15. In the case of the conventional suspension 2 shown in FIG. 5A, a part 16a of the viscoelastic member projects much from the periphery of the restrainer 15 if the pressing force on the damper 14 is heavy. Thus, an operation is needed to remove the projecting part 16a of the viscoelastic member.

According to the load beam 10' of the present invention, however, a groove 25 is formed between an inner side surface 20b of the recess 20 and the side surface of the restrainer 15, as shown in FIG. 5B. Thus, the part 16a of the viscoelastic member projecting from the periphery of the restrainer 15 is confined within the groove 25. Consequently, the operation to remove the projecting part 16a of the viscoelastic member can be omitted.

Figure 6A:
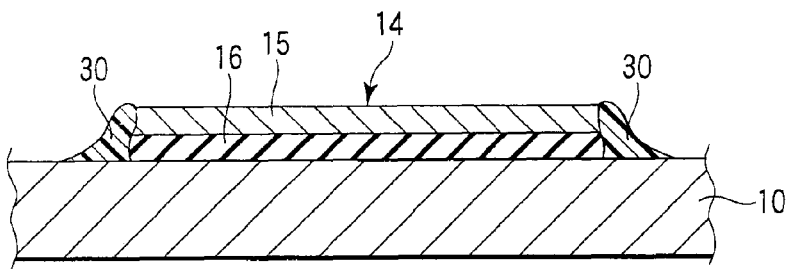
FIG. 6A is a sectional view showing how the periphery of the damper of the conventional suspension is covered by a coating material.

Conventionally, as shown in FIG. 6A, the side surface of the damper 14 is located outside the load beam 10, so that a considerable amount of a coating material 30 is used to cover the side surface of the damper.

According to the suspension of the present invention, however, a coating material 30 is filled into the groove 25 between the inner side surface 20b of the recess 20 and the damper 14 after the damper 14 is affixed to the bottom surface 20a of the recess 20, as shown in FIG. 6B. Thereupon, the side surface of the damper 14 is covered by the coating material 30. Thus, the usage of the coating material 30 can be reduced compared to the conventional case.

Figure 8A:
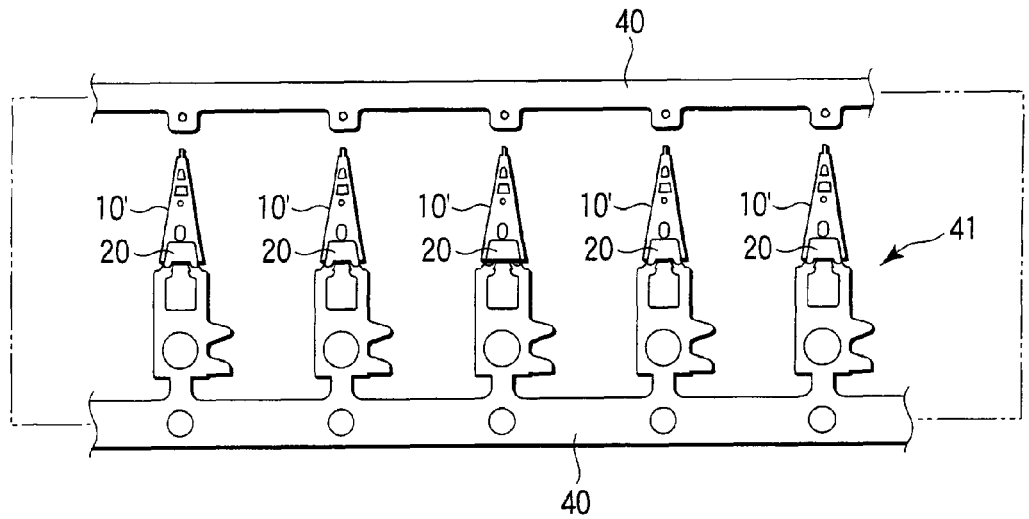
FIG. 8A is a plan view showing a load beam blank with recesses.

FIG. 8A shows a load beam blank 41 comprising a plurality of load beams 10' and scrap portions 40. The load beam blank 41 is formed by, for example, etching. Each recess 20 should preferably be formed by partial etching as the load beam blank 41 is etched. Further, the recess 20 may be formed by pressing.

Alternatively, as shown in FIG. 6C, each load beam 10' may be formed by superposing two thin plates 50 and 51 on each other, and each recess 20 may be formed by boring a through-hole 52 greater than each damper 14 in the one plate 50.

Each load beam 10' is bent with the damper 14 affixed to the bottom surface 20a of the recess 20. In order to avoid interference between the bending tool and damper 14, a depth D1 (FIG. 2) of the recess 20 should preferably be made greater than a thickness T1 of the damper 14. In this embodiment, the recess 20 is formed in that one of the obverse and reverse surfaces of the load beam 10' which is located opposite from a flexure 12. Alternatively, however, the recess 20 may be formed in the same surface as the flexure 12.

Figure 7A:
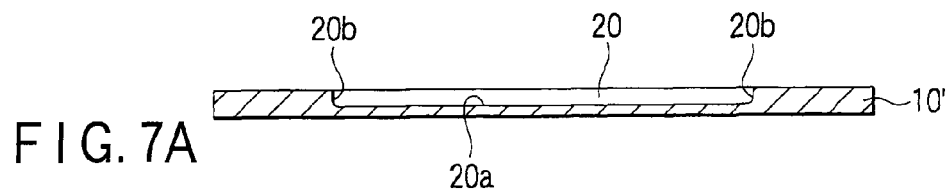
FIG. 7A is a sectional view showing the load beam formed with a recess before bending work.
Figure 7B:
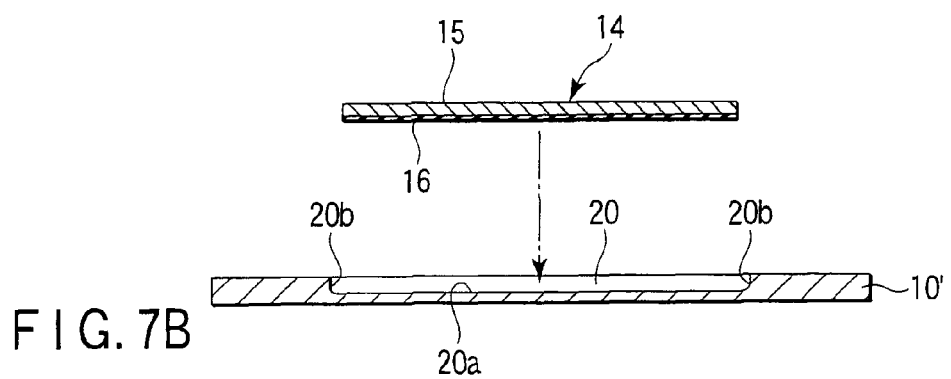
FIG. 7B is a sectional view showing the load beam shown in FIG. 7A and the damper before affixture.
Figure 7C:
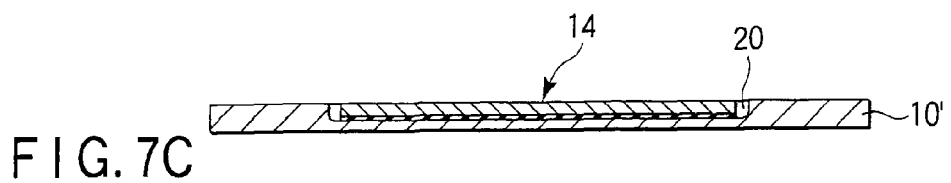
FIG. 7C is a sectional view showing how the damper shown in FIG. 7B is affixed to the load beam.
Figure 7D:
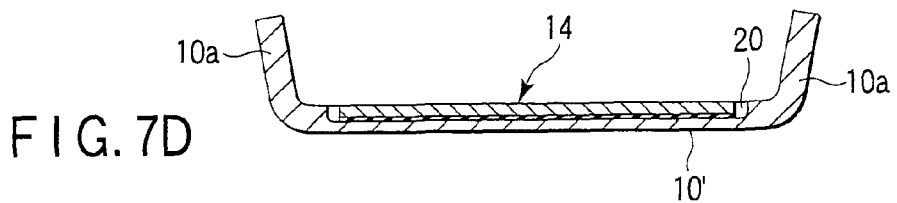
FIG. 7D is a sectional view showing the load beam and damper after rib bending.

The following is a description of processes for manufacturing the suspension with the load beam 10'. As shown in FIG. 7A, the recess 20 is formed in the load beam 10' that is not yet bent. As shown in FIG. 7B, thereafter, the damper 14 is opposed to the bottom surface 20a of the recess 20. Then, the damper 14 is affixed to the bottom surface 20a of the recess 20, as shown in FIG. 7C. Thereafter, the rib bending and load bending of the load beam 10' are performed by means of the bending tool, e.g., a die set (not shown).

According to this embodiment, the damper 14 is affixed to the unbent flat load beam 10' (FIGS. 7A to 7C). Therefore, rib-like opposite side edge portions 10a can be prevented from interfering with a device for affixing the damper 14. Thus, the operation for affixing the damper 14 to the load beam 10' can be automated more easily than in the case of the conventional suspension 2 (FIG. 1A).

Figure 8B:
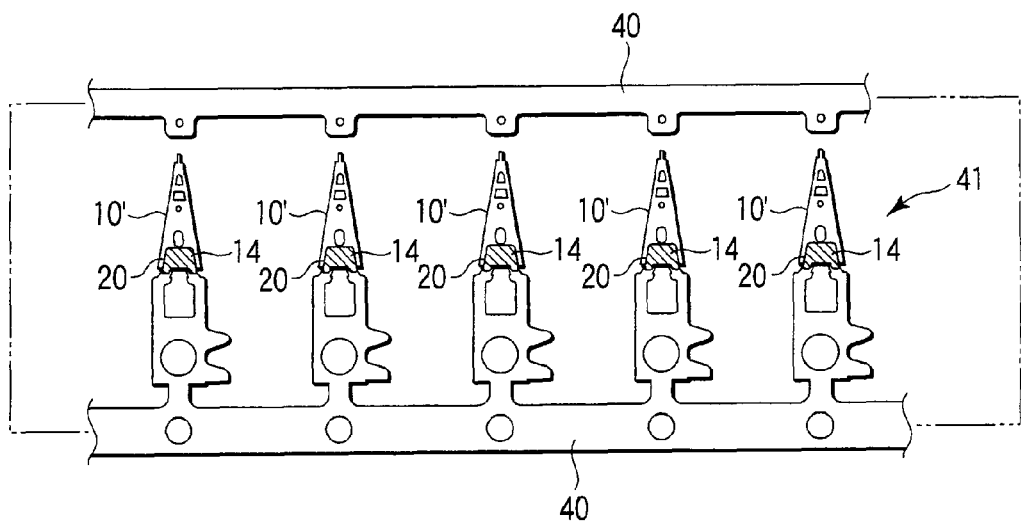
FIG. 8B is a plan view showing how each load beam of the load beam blank shown in FIG. 8A is provided with the damper.
Figure 9A:
FIG. 9A is a sectional view showing a conventional load beam before bending work.
Figure 9B:
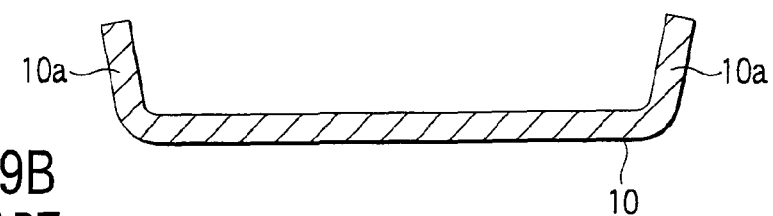
FIG. 9B is a sectional view showing the conventional load beam after the bending work.
Figure 9C:
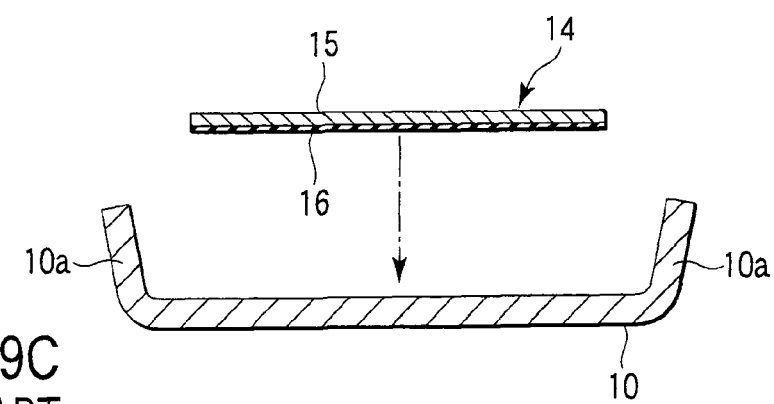
FIG. 9C is a sectional view showing the conventional load beam and the damper before affixture.
Figure 9D:
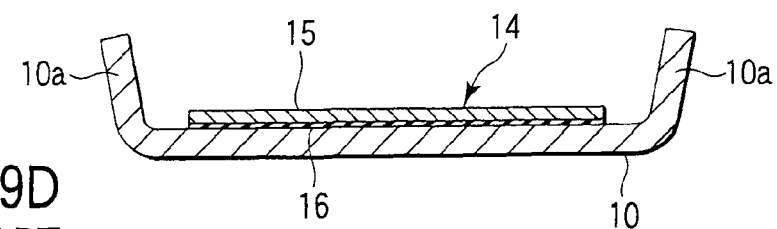
FIG. 9D is a sectional view showing how the damper is affixed to the conventional load beam.

As shown in FIG. 8A, the continuous load beam blank 41 comprising the plurality of load beams 10' may be formed by etching. As shown in FIG. 8B, in this case, the damper 14 should be affixed to the recess 20 of each load beam 10' of the load beam blank 41. By doing this, the damper affixing operation can be automated with higher speed and accuracy and less deformation, so that the operation efficiency can be further improved.

The present invention is not limited to the embodiment described herein, and its constituent elements may be embodied in various forms without departing from the scope or spirit of the invention. Further, the invention is also applicable to suspensions of other disk drives than hard disk drives.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A suspension configured for a disk drive to support a magnetic head, said suspension comprising:
   - a load beam formed of a thin-plate spring, the load beam comprising a bent portion which is bent in a thickness direction when viewed laterally relative thereto, and having a recess formed in a region including the bent portion, and
   - a damper contained in the recess of the load beam, the damper comprising a restrainer and a viscoelastic member laminated thereon, the restrainer being affixed to a bottom surface of the recess via the viscoelastic member with the viscoelastic member being provided between the bottom surface and the restrainer, and
   - a groove which is a part of the recess and which is formed between an inner side surface of the recess and a side surface of the restrainer,
   - wherein a part of the viscoelastic member projecting from a periphery of the restrainer is provided between the periphery of the restrainer and the inner side surface of the recess.

2. The suspension according to claim 1, wherein the the bent portion forms a hinge portion.

3. The suspension according to claim 1, wherein the recess comprises a partial etched recess.

4. The suspension according to claim 1, wherein the recess comprises a pressed recess.

5. The suspension according to claim 1, wherein the load beam comprises a first plate which has a through-hole for the recess configured to contain the damper, a size of the through-hole being greater than a size of the damper, and a second plate superposed to the first plate.

6. The suspension according to claim 1, wherein a depth of the recess is greater than a thickness of the damper.

* * * * *